(12) United States Patent
DeBiasi et al.

(10) Patent No.: US 7,829,003 B2
(45) Date of Patent: Nov. 9, 2010

(54) METHOD OF MAKING AN ARTICLE

(75) Inventors: David DeBiasi, Westland, MI (US);
Mathew P. Varughese, Troy, MI (US);
Jon P. Pavlinac, South Lyon, MI (US)

(73) Assignee: BASF Corporation, Florham Park, NJ (US)

( * ) Notice: Subject to any disclaimer, the term of this patent is extended or adjusted under 35 U.S.C. 154(b) by 490 days.

(21) Appl. No.: 11/379,434

(22) Filed: Apr. 20, 2006

(65) Prior Publication Data

US 2007/0246852 A1 Oct. 25, 2007

(51) Int. Cl.
*B28B 1/16* (2006.01)
*B29C 39/12* (2006.01)
*B29C 41/22* (2006.01)
*B29C 44/06* (2006.01)

(52) U.S. Cl. .................. 264/255; 264/245; 264/250; 264/260; 264/263; 264/308; 264/309; 264/511; 264/101; 427/282

(58) Field of Classification Search .................. 425/103, 425/387.1, 388, 389, 405.1, 405.2, DIG. 50, 425/DIG. 60; 264/45.1, 45.4, 46.4, 241, 264/255, 264, 101, 308, 309, 510–512, 246, 264/250, 259, 260, 263, 102, DIG. 72; 156/245, 156/285; 427/282; 118/504, 505

See application file for complete search history.

(56) References Cited

U.S. PATENT DOCUMENTS 2,286,473 A * 6/1942 Duggan ...................... 118/505
2,363,841 A * 11/1944 Duggan ...................... 118/505
2,363,842 A * 11/1944 Duggan ...................... 118/505
2,371,859 A * 3/1945 Wallace ...................... 118/505
4,406,246 A * 9/1983 DeMeyer et al. ............ 118/505

(Continued)

FOREIGN PATENT DOCUMENTS

EP 0247359 A2 * 12/1987

(Continued)

OTHER PUBLICATIONS

English language Abstract for JP 59-177166 extracted from *Japanese Patent Office*, Patent Abstracts of Japan.

*Primary Examiner*—Philip C Tucker
*Assistant Examiner*—Dimple N Bodawala
(74) *Attorney, Agent, or Firm*—Howard & Howard Attorneys PLLC

(57) ABSTRACT

A mask is used to make an article having two or more layers. The layers are formed from either a paint or polyurethane elastomer composition. The article is made in a mold including a surface defining a mold cavity and having a first and second effect region. For the method, a mask is placed into the mold cavity adjacent the first effect region. Pressure is applied to the mask to retain the mask adjacent the first effect region. A first composition is applied into the mold cavity to form a first layer adjacent the second effect region. The mask is removed from the first effect region. A second composition is applied into the mold cavity to form a second layer adjacent the first effect region. Benefits of pressure applied to a mask are also realized when making the article from a preformed part using the mask outside of a mold.

28 Claims, 5 Drawing Sheets

U.S. PATENT DOCUMENTS

| | | | |
|---|---|---|---|
| 4,668,451 A | 5/1987 | Langson | |
| 4,880,588 A * | 11/1989 | Brault et al. | 264/163 |
| 4,942,013 A * | 7/1990 | Palmer et al. | 264/511 |
| 4,946,640 A * | 8/1990 | Nathoo | 264/316 |
| 5,091,220 A * | 2/1992 | Horiki et al. | 427/272 |
| 5,168,636 A * | 12/1992 | Golden | 33/564 |
| 5,281,388 A | 1/1994 | Palmer et al. | |
| 5,405,112 A | 4/1995 | Trethewey | |
| 5,462,421 A * | 10/1995 | Stein et al. | 425/4 R |
| 5,511,752 A * | 4/1996 | Trethewey | 248/205.9 |
| 5,576,030 A | 11/1996 | Hooper | |
| 5,580,501 A * | 12/1996 | Gallagher et al. | 264/45.3 |
| 5,885,662 A * | 3/1999 | Gardner, Jr. | 427/426 |
| 5,939,013 A * | 8/1999 | Han et al. | 264/510 |
| 5,961,902 A * | 10/1999 | Ishitoya et al. | 264/45.9 |
| 5,962,072 A | 10/1999 | Yerman | |
| 6,071,619 A * | 6/2000 | De Winter | 428/423.1 |
| 6,319,438 B1 * | 11/2001 | Smith et al. | 264/75 |
| 6,440,219 B1 | 8/2002 | Nguyen | |
| 6,444,303 B1 | 9/2002 | Ali et al. | |
| 6,544,449 B1 * | 4/2003 | Gardner | 264/46.5 |
| 6,555,045 B2 * | 4/2003 | McClure et al. | 264/510 |
| 6,641,672 B2 | 11/2003 | Nguyen | |
| 6,649,107 B2 * | 11/2003 | Harrison et al. | 264/241 |
| 6,723,273 B2 | 4/2004 | Johnson et al. | |
| 6,875,390 B2 | 4/2005 | Cowelchuk | |
| 7,033,660 B2 * | 4/2006 | Cowelchuk et al. | 428/71 |
| 7,390,555 B2 * | 6/2008 | Shane | 428/151 |
| 2003/0170460 A1 * | 9/2003 | Sienkiewicz et al. | 428/411.1 |
| 2005/0133957 A1 * | 6/2005 | Williams et al. | 264/245 |
| 2005/0161865 A1 | 7/2005 | Bristow et al. | |
| 2007/0145641 A1 * | 6/2007 | Donatti et al. | 264/309 |

FOREIGN PATENT DOCUMENTS

| | | |
|---|---|---|
| JP | 59-177166 | 10/1984 |
| WO | WO 2005056631 A1 * | 6/2005 |

\* cited by examiner

METHOD OF MAKING AN ARTICLE

FIELD OF THE INVENTION

The present invention generally relates to a method of making an article. More specifically, the present invention relates to a method of making an article having two or more layers. The article may be, for example, a headrest, a trim panel, a seat, a pillar trim panel, an instrument panel, a door panel, or an armrest.

DESCRIPTION OF THE RELATED ART

"Masking-off" or "masking" is a common method of protecting a surface from receiving paint when paint is being applied to an adjacent surface. In manufacturing, masking may be used to make a multilayer or multi-tone skin having two or more layers. For example, instrument panels, seats, headrests, armrests, trim panels, pillar panels, and door panels for vehicles often include a skin that provides an aesthetically pleasing covering. The skin commonly includes a relatively thin outer paint layer with a thicker polyurethane elastomeric backing layer. The outer paint layer provides a desired color and UV degradation resistance quality of the skin. The elastomeric backing layer provides a desired elastic tactile, strength, tear resistance, and water resistance quality of the skin. The skin also presents a smooth, textured or grained pattern of the article.

The skins are typically made in a mold including a surface that defines a mold cavity. To make a skin that includes a first color and a second color different from the first color, i.e. a two-tone skin, the surface has a first region and a second region in the mold cavity. A mask is placed over the first region, and a first paint composition corresponding to the first color of the skin is sprayed onto the second region to form a first paint layer. The mask is then removed to expose the first region. A second paint composition corresponding to the second color of the skin is sprayed onto the first region to form a second paint layer. Next, an elastomer composition is sprayed onto the back of the first and second layers to form the elastomeric backing layer.

U.S. Pat. No. 6,444,303 to Ali et al. (the '303 patent) discloses a method of making a fabric-less skin in a mold including a surface that defines a mold cavity. The method includes a coating step that involves the use of an in-mold coating station. During the coating step, a mask is placed into a bottom of the mold cavity over a first region. A first paint composition is then sprayed onto the surface of the mold to form a first paint layer. The mask is removed from the mold cavity and cleaned. Next, a second paint composition is sprayed onto the first region to form a second paint layer. A polyurethane elastomer is then spayed onto the back off the paint layers to finish the fabric-less skin. During the coating step, the force of gravity holds the mask against the bottom of the mold cavity. Unfortunately, the mask can be lifted up and off of the bottom of the mold cavity during spraying off the first paint composition, thereby painting and contaminating the first region with the first paint composition. In addition, placement of the mask in the mold cavity is limited due to the dependence on the force of gravity to hold the mask in place.

U.S. Pat. No. 6,875,390 to Cowelchuk (the '390 patent) addresses the mask lifting issue of the '303 patent. The '390 patent discloses a method of making a skin for an instrument panel. The method uses a mold including a surface defining a mold cavity. The surface has a first region and a second region in the mold cavity. A mask including magnets is magnetically secured to the surface of the mold cavity over the first region. A first paint composition corresponding to a first color of the skin is applied onto the second region to form a first paint layer. The mask is then removed from the mold cavity. A second paint composition corresponding to a second color of the skin is applied onto the first region to form a second paint layer. An elastomer is then applied onto the back of the paint layers to form an elastomeric backing layer. Due to the reliance on magnets, the mask is limited to use in ferrous metallic molds. In addition, precise incremental movement of the mask once magnetically attached to the surface is difficult due to the magnetic attraction between the mask and the mold.

Both methods of the '303 and '390 patents also suffer from a lack of a complete seal between the mask and the surface of the mold, particularly upon a textured or patterned surface of the mold at an interface between the first and second regions. The lack of seal results in a non-distinct line between the first and second colors of the skin.

Due to the deficiencies of the prior art, there is an opportunity to provide a method of making an article. The article may be made in a mold using a mask that is independent from the force of gravity, easy to manipulate and place, and compatible with non-metallic molds in addition to ferrous and non-ferrous metallic molds. The article may also be made from a preformed part using the mask. Specifically, with such preformed parts, the apparatus of the mold is not necessarily required.

SUMMARY OF THE INVENTION AND ADVANTAGES

The present invention provides a method of making an article. The article includes a first layer and a second layer. Pressure is applied to a mask to retain the mask adjacent a region for masking purposes to make the article.

In one embodiment, the present invention provides a method of making an article in a mold. The mold includes a surface that defines a mold cavity. The surface has a first effect region and a second effect region in the mold cavity. For the method, a mask is placed into the mold cavity adjacent the first effect region. Pressure is applied to the mask to retain the mask adjacent the first effect region. A first composition is applied into the mold cavity to form a first layer adjacent the second effect region. The mask is removed from the first effect region. A second composition is applied into the mold cavity to form a second layer adjacent the first effect region.

In another embodiment, the present invention provides a method of making an article from a preformed part. The preformed part includes an elastomeric backing layer having a first side and a second side spaced from the first side. The first side includes a first region and a second region. For the method, a first paint composition is applied onto the elastomeric backing layer to form a first paint layer adjacent the first region. A mask is placed onto the elastomeric backing layer adjacent the first region. Pressure is applied to the mask to retain the mask adjacent the first region. A second paint composition is applied onto the elastomeric backing layer to form a second paint layer adjacent the second region. The mask is removed from the first region.

Accordingly, the present invention provides a cost-effective and simple method of making an article. Pressure applied to the mask allows the mask to overcome the force off gravity. To make the article in the mold, the mask may be placed on a plurality off different surfaces within the mold cavity without the restrictions that exist when gravity is relied upon. For example, the mask may be retained on a vertical surface, a diagonal surface, an upside-down horizontal surface, or a right-side-up horizontal surface of the mold cavity. To make the article from the preformed part, the mask may be placed on a plurality of different surfaces on the preformed part such that the apparatus of the mold is not required.

The use of pressure also allows for easy manipulation and placement of the mask by simple control of the pressure. The mask is also easy to remove by simply reducing or removing pressure from the mask. The mask may also be used in a wide range of molds, such as in composite molds or metallic molds. The mask may also be used in a wide range of preformed parts.

Also, due to the use of pressure, a complete seal may be created between the mask and the surface of the mold, thereby completely protecting the first effect region from contamination. A complete seal may also be created between the mask and the preformed part, thereby completely protecting the first region from contamination.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate like parts throughout the several views, an article made in accordance with a method of the present invention is shown generally at 20.

Figure 1:
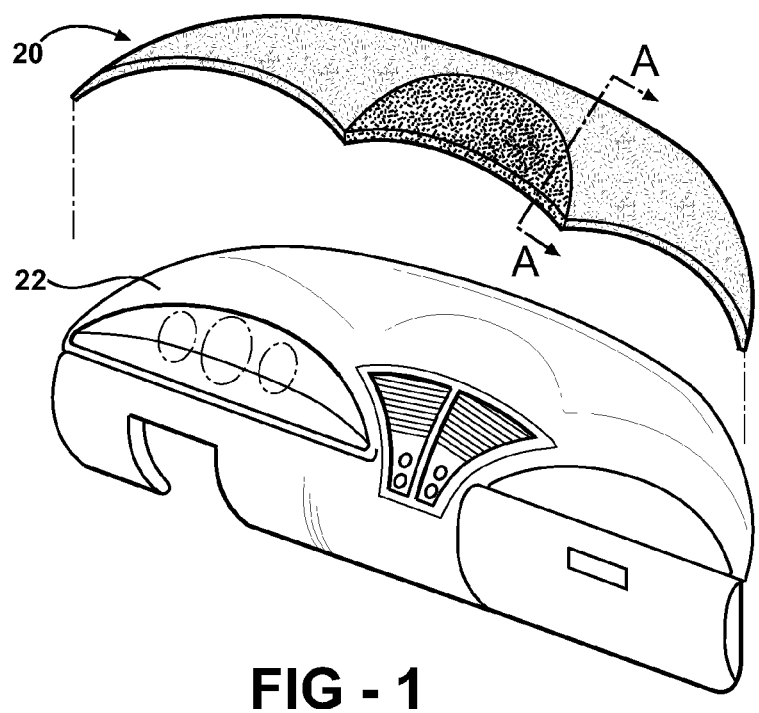
FIG. 1 is an exploded perspective view of an instrument panel of a vehicle and a skin made in accordance with the present invention.

In one embodiment, as shown in FIG. 1, the article 20 is a skin for covering an instrument panel 22 of a vehicle. While the article 20 is shown as a skin for covering the instrument panel 22, it is to be appreciated that in other embodiments, the article 20 may be further defined as at least one of a headrest, a trim panel, a seat, a pillar trim panel, an instrument panel, a door panel, and an armrest.

Figure 4:
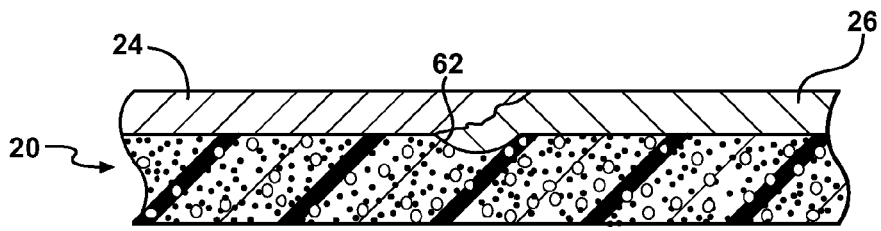
FIG. 4 is a cross-sectional side view of another embodiment of the skin of FIG. 1 taken along line A-A.
Figure 5:
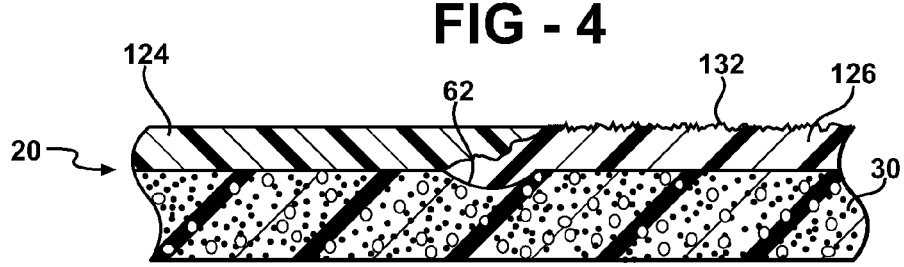
FIG. 5 is a cross-sectional side view of another embodiment of the skin of FIG. 1 taken along line A-A.
Figure 6:
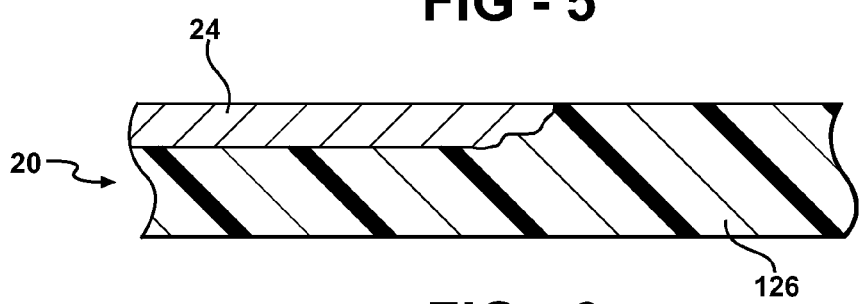
FIG. 6 is a cross-sectional side view of another embodiment of the skin of FIG. 1 taken along line A-A.

Referring to FIGS. 2-6, the article 20 includes a first layer 24, 124 and a second layer 26, 126. In one embodiment, as shown in FIGS. 2-5, the first layer 24, 124 and the second layer 26, 126 are adjacent to each other, i.e. the layers are substantially co-planar. In one embodiment, the article 20 may have a distinct line between the first layer 24, 124 and the second layer 26, 126. In another embodiment, the first layer 24, 124 and the second layer 26, 126 may be slightly spaced from each other, thereby defining a gap or recess there between. A slight overlap between the first layer 24, 124 and the second layer 26, 126 may result in an overspray bump 62. In another embodiment, as shown in FIG. 6, the second layer 26, 126 is adjacent to and substantially overlaps the first layer 24, 124. In other embodiments (not shown), the article 20 may include three or more adjacent layers in any combination of the relationships to each other as shown in FIGS. 2-6. For example, the article 20 may include red, white, and blue layers.

Figure 2:
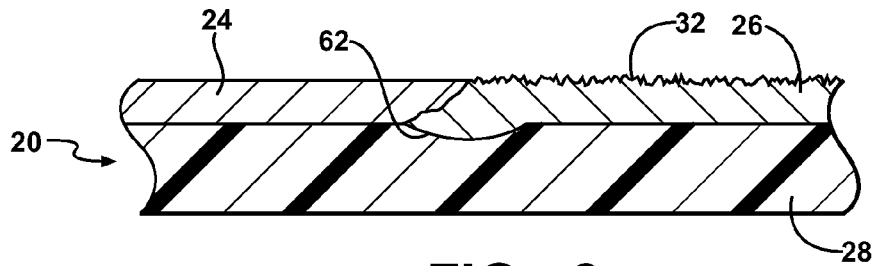
FIG. 2 is a cross-sectional side view of one embodiment of the skin of FIG. 1 taken along line A-A.

The first layer 24, 124 is formed from a first composition and the second layer 26, 126 is formed from a second composition. The first and second compositions may be the same or different from each other. In one embodiment, as shown in FIG. 2, the first composition is further defined as a first paint composition, and the first layer 24, 124 is further defined as a first paint layer 24. Likewise, the second composition is further defined as a second paint composition, and the second layer 26, 126 is further defined as a second paint layer 26. The first and second paint compositions may be selected from the group off acrylic-based paint compositions, polyester-based paint compositions, polyurethane-based paint compositions, and combinations thereof. The paint layers 24, 26 provide a desired color, UV degradation resistance, texture, and/or grain pattern off the article 20. The paint layers 24, 26 may include different texture or grain patterns, and may further include different colors than each other. For example, as also shown in FIG. 2, the second paint layer 26 may have a textured surface 32, and the first paint layer 24 may have a smooth surface.

Alternatively, as shown in FIG. 5, the first composition is further defined as a first polyurethane elastomer composition, and the first layer 24, 124 is further defined as a first elastomeric layer 124. Likewise, the second composition is further defined as a second polyurethane elastomer composition, and the second layer 26, 126 is further defined as a second elastomeric layer 124. The first and second polyurethane elastomer compositions may include the reaction product of an isocyanate and a polyol. The isocyanate may be selected from the group off aromatic isocyanates, aliphatic isocyanates, and combinations thereof. The first and second polyurethane elastomer compositions may also include a UV package and/or other additives that are known in the art. The elastomeric layers 124, 126 provide a desired color, elastic tactile quality, UV degradation resistance, strength, tear resistance, water resistance, texture, and/or grain pattern of the article 20. The elastomeric layers 124, 126 may include different texture or grain patterns, and may further include different colors than each other. For example, as shown in FIG. 5, the second elastomeric layer 126 may have a textured surface 132 and the first elastomeric layer 124 may have a smooth surface.

In other embodiments, combinations of paint compositions and polyurethane elastomer compositions may be used for the respective first and second compositions. For example, as shown in FIG. 6, the first composition is further defined as the first paint composition, and the first layer 24, 124 is further defined as the first paint layer 24. The second composition is further defined as the second polyurethane elastomer composition, and the second layer 26, 126 is further defined as the second elastomeric layer 126. Conversely, in another embodiment (not shown), the first composition is further defined as the first polyurethane elastomer composition, and the first layer 24, 124 is further defined as the first elastomeric layer 124. The second composition is further defined as the second paint composition, and the second layer 26, 126 is further defined as the second paint layer 26.

Figure 3:
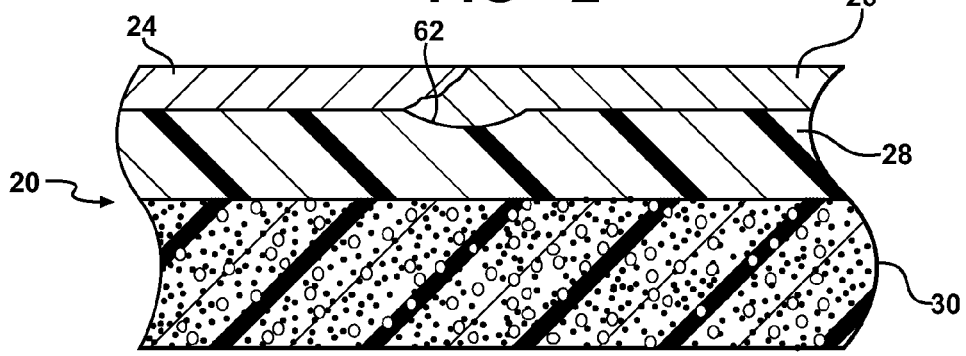
FIG. 3 is a cross-sectional side view of another embodiment of the skin of FIG. 1 taken along line A-A.

Referring to FIGS. 2 and 3, the article 20 may further include an elastomeric backing layer 28. In one embodiment, as shown in FIGS. 2 and 3, the elastomeric backing layer 28 is adjacent to and substantially overlaps the first layer 24, 124 and the second layer 26, 126. The first layer 24, 124 and the second layer 26, 126 may be relatively thin compared to the elastomeric backing layer 28. However, it is to be appreciated that the first layer 24, 124, the second layer 26, 126, and the elastomeric backing layer 28 may each be of relatively the same thickness.

The elastomeric backing layer 28 is formed from a polyurethane elastomer composition. The polyurethane elastomer composition may be the same or different from the first and/or the second polyurethane elastomer compositions of the first layer 24, 124 and the second layer 26, 126 respectively. As such, the polyurethane elastomer composition may include the reaction product of an isocyanate and a polyol. The isocyanate may be selected from the group of aromatic isocyanates, aliphatic isocyanates, and combinations thereof. The polyurethane elastomer composition may also include a UV package and/or other additives as known in the art. The elastomeric backing layer 28 formed from the polyurethane elastomer composition provides a desired elastic tactile, strength, tear resistance, and water resistance quality of the article 20.

Referring to FIGS. 3-5, the article 20 may further include a foam backing layer 30. In one embodiment, as shown in FIGS. 4 and 5, the foam backing layer 30 is adjacent to and substantially overlaps the first layer 24, 124 and the second layer 26, 126. In another embodiment, as shown in FIG. 3, the foam backing layer 30 is adjacent to and substantially overlaps the elastomeric backing layer 28. The first layer 24, 124 and the second layer 26, 126 may be relatively thin compared to the foam backing layer 30. However, it is to be appreciated that the first layer 24, 124, the second layer 26, 126, and the foam backing layer 30 may each be of relatively the same thickness.

The foam backing layer 30 is formed from a polyurethane foam composition. The polyurethane foam composition may include the reaction product of an isocyanate and a polyol. The isocyanate may be selected from the group of aromatic isocyanates, aliphatic isocyanates, and combinations thereof. The isocyanate and the polyol may be the same or different from those of the polyurethane elastomer compositions set forth above. Furthermore, the foam backing layer 30 is formed in the presence of a blowing agent. The blowing agent may be selected from the group of physical blowing agents, chemical blowing agents, and combinations thereof. The polyurethane foam composition may also include a UV package and/or other additives as known in the art. The foam backing layer 30 formed from the polyurethane foam composition provides a desired elastic tactile and kinetic energy absorption quality of the article 20.

Figure 7:
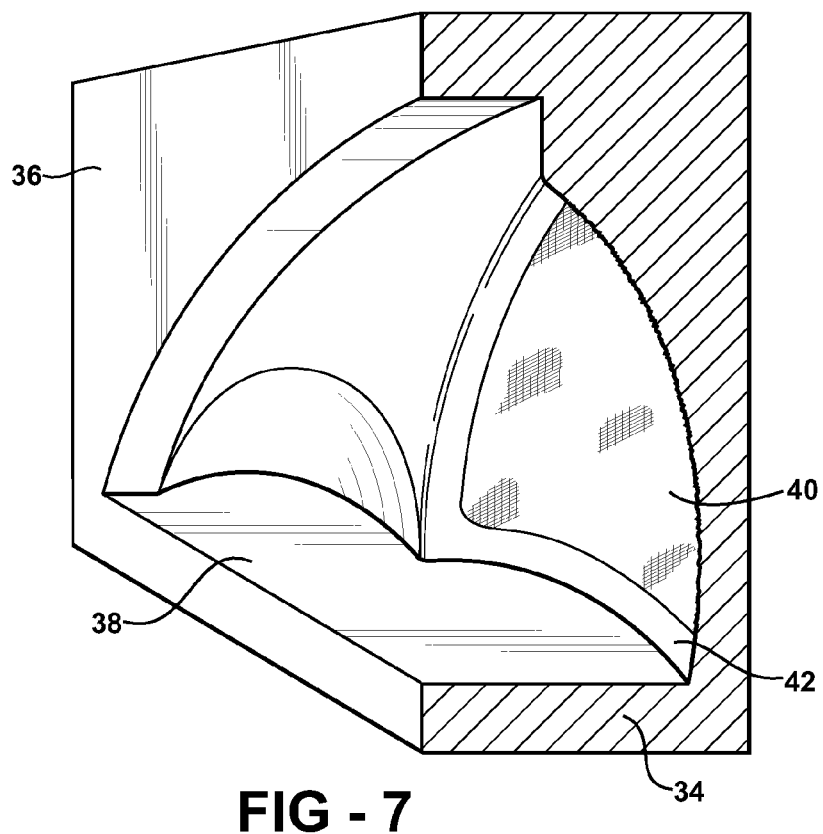
FIG. 7 is a cross-sectional perspective view of a mold including a surface defining a mold cavity with the surface having a first effect region and a second effect region in the mold cavity.

In one embodiment, the method of making the article 20 occurs in a mold 34. One example of a mold 34 that is suitable for purposes of the present invention is shown in FIG. 7. The mold 34 may be any suitable mold, such as an open or a closed-type mold. In addition, the mold 34 may be formed from any suitable material. For example, the mold 34 may be formed from a composite or metallic material. The mold 34 includes a surface 36 that defines a mold cavity 38. The surface 36 has a first effect region 40 and a second effect region 42 in the mold cavity 38. For purposes of the present invention, the first effect region 40 includes any region that is meant to correspond to the first layer 24, 124 and the second effect region 42 includes any region that is meant to correspond to the second layer 26, 126 of the article 20. The effect regions 40, 42 may have textured or grained patterns formed therein. The effect regions 40, 42 may have different texture or grain patterns, or they may both be the same. The texture or grain pattern of the effect region 40, 42 may be transferred to the corresponding first layer 24, 124 or second layer 26, 126. For example, the first effect region 40 may have a texture pattern that results in the second layer 26, 126 having the textured surface 32, 132 as shown in FIGS. 2 and 5. Likewise, the second effect region 42 may have a smooth surface pattern that results in the first layer 24, 124 having the smooth surface as also shown in FIGS. 2 and 5. In other embodiments (not shown), the surface 20 may include three or more effect regions in the mold cavity 38 to result in different texture or grain patterns. In one embodiment, the surface 36 defines a hole extending through the first effect region 40 into the mold cavity 38 for supplying a fluid to and from the mold cavity 38. In other embodiments, the surface 36 may define more than one hole extending through the first effect region 40 into the mold cavity 38. In yet other embodiments, the surface 36 may define one or more holes extending through the second effect region 42 and optionally, the first effect region 40. The fluid may be a gas. For example, the fluid may be air.

Figure 9:
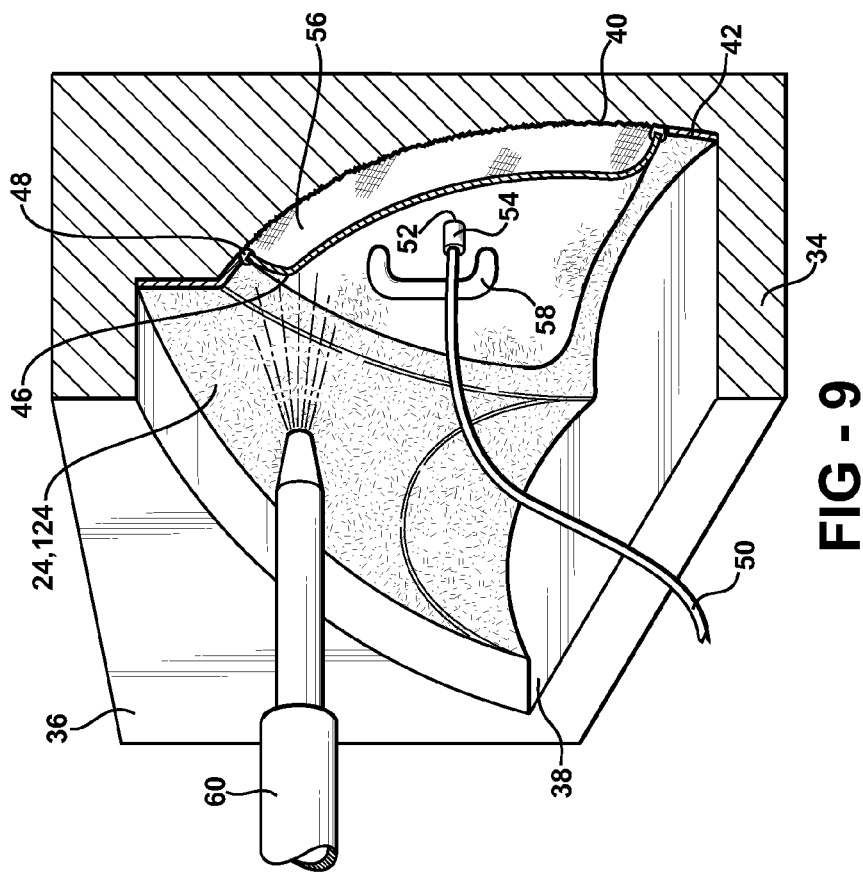
FIG. 9 is a cross-sectional perspective view of the mold and the mask of FIG. 8 illustrating a step of applying a first composition into the mold cavity to form a first layer.
Figure 8:
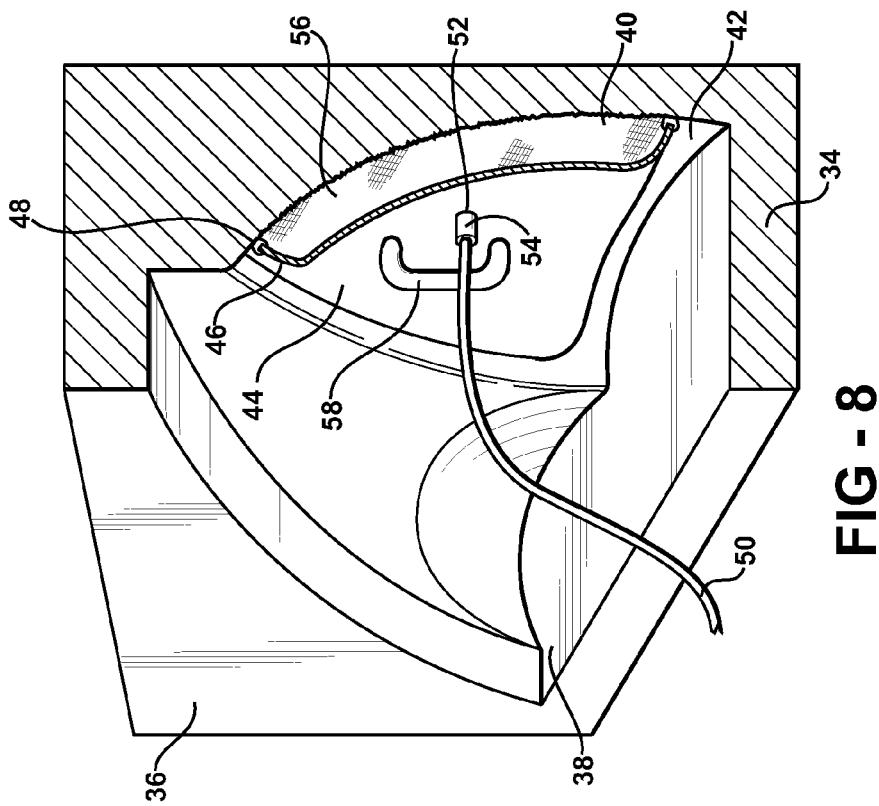
FIG. 8 is a cross-sectional perspective view of the mold of FIG. 7 and a mask retained adjacent the first effect region.

To make the article 20 in the mold 34, the method of the present invention includes the step of placing a mask 44 into the mold cavity 38 adjacent the first effect region 40. FIGS. 8 and 9 show the mask 44 adjacent the first effect region 40. The mask 44 is shaped and sized to cover the first effect region 40 in the mold cavity 38. In one embodiment, the mask 44 may be pre-formed into a preset shape. In another embodiment, the mask 44 may be custom-made for covering the first effect region 40 in the mold cavity 38. The mask 44 may be formed from any suitable material. For example, the mask 44 may be formed from a fiber, polymeric, plastic, metallic, or composite material.

To custom-make the mask 44, a reinforcing fiber material may be used to form a mat. The reinforcing fiber material may be cut to slightly larger than the shape and size of the first effect region 40 and formed into the mat having a desired shape to cover the first effect region 40. The reinforcing fiber material may be selected from the group of mica fibers, glass fibers, carbon fibers, metal fibers, linear polyethylene fibers, polypropylene fibers, polyester fibers, acrylic fibers, polycarbonate fibers, thermosetting plastic fibers, thermosetting polymer fibers, and combinations thereof.

A resin is applied to the mat to saturate it. The resin may be selected from the group of epoxies, unsaturated polyesters, vinyl esters, and combinations thereof.

A sealant is applied to the second effect region 42 such that the sealant encircles the first effect region 40 adjacent a perimeter thereof. The sealant may be selected from the group of RTV silicones, sheet waxes, and combinations thereof. The mat is then placed onto the surface 36 of the mold cavity 38 substantially over the first effect region 40.

After the mat is in the mold cavity 38, a veil is placed into the mold cavity 38 over the mat and in contact with the sealant to create an airtight chamber encapsulating the mat. The veil may be formed from a polymeric film. The veil defines an opening for allowing air to be removed from the airtight chamber. A vacuum port is attached to the veil at the opening. Vacuum is applied through the vacuum port for removing air from the airtight chamber, thus drawing the resin into void spaces within the mat.

The resin in the mask 44 is cured and vacuum is removed. The veil and the mask 44 are then removed from the mold cavity 38, and the sealant is removed from the second effect region 42. A peripheral edge 46 of the mask 44 is then finished to precisely shape the mask 44 to conform to the first effect region 40. Finishing the peripheral edge 46 also reduces any tolerance deviations between the mask 44 and the surface 36 of the mold 34. The peripheral edge 46 may be finished, for example, by sanding.

Sealant is applied to the peripheral edge 46 after finishing the peripheral edge 46 to form a flexible seal 48. The flexible seal 48 compensates for any tolerance variations between the peripheral edge 46 of the mask 44 and the surface 36 of the mold 34. A vacuum port 54 is attached to the mask at the hole 52. A handle 58 is attached to the mask 44 for manipulating and handling the mask 44. In other embodiments (not shown), the mask 44 may be further customized. For example, the handle 58 may include a relief valve. The relief valve allows a user of the mask 44 to quickly reduce pressure and facilitates placement and removal of the mask 44.

To make the article 20 in the mold 34, pressure is applied to the mask 44 to retain the mask 44 adjacent, i.e. on, the first effect region 40. Pressure may be applied by any method or equipment known in the art. Pressure applied to the mask 44 may be continuous or intermittent. Typically, pressure is applied by vacuum. For example, pressure may be applied by a vacuum pump. In one embodiment, as shown in FIGS. 8 and 9, the mask 44 is pierced to define a hole 52. A vacuum line 50 is attached to the vacuum port 54. Vacuum is applied through the hole 52 in the mask 44 to retain the mask 44 adjacent the first effect region 40. The vacuum port 54 may be used to regulate vacuum applied to the mask 44 through the vacuum line 50. The vacuum port 54 may also be used as a quick-connect/disconnect between the vacuum line 50 and the mask 44. In another embodiment (not shown), pressure may be applied to the mask 44 through the mold 34. As previously discussed, the surface 36 of the mold 34 may define the hole extending through the surface 36 into the mold cavity 38. Vacuum is applied through the hole in the surface 36 to retain the mask 44 adjacent the first effect region 40. When the mask 44 is removed from the first effect region 40, the hole may be plugged to prevent contamination. Alternatively, the hole may be left open. Fluid, e.g., air, may then be applied through the hole into the mold cavity 38 to clean debris from the hole. The debris may be, for example, a mold release agent.

When the mask 44 is placed into the mold cavity 38, an airtight envelope 56 is defined between the mask 44 and the surface 36 of the mold 34. While the mask 44 is shown such that the airtight envelope 56 appears large, it is to be appreciated that in other embodiments, the airtight envelope 56 may be small such that the mask 44 is substantially adjacent the surface 36 of the mold cavity 38. In yet another embodiment, a substantial portion of the mask 44 may abut the first effect region 40. It is to be appreciated that the airtight envelope 56 may seal any fluid, and is not limited to air.

The first composition is applied into the mold cavity 38 to form the first layer 24, 124 adjacent, i.e. on, the second effect region 42. The first composition may be applied by any suitable manner as known in the art. For example, the first composition may be applied by spraying, by directing a powdered material, or by reactive injecting into the mold cavity 38. FIG. 9 shows a spray nozzle 60 applying the first composition into the mold cavity 38 to form the first layer 24, 124. The mask 44 covers and protects the first effect region 40 in the mold cavity 38 from the first composition. In another embodiment, the first composition is directed by the spray nozzle 60 substantially towards the second effect region 42 such that the first composition substantially avoids the mask 44. It should be appreciated, that if a leak is present in the airtight envelope 56 and if the first composition enters through the leak, the first composition is drawn toward the hole 52 in the mask 44 or the hole in the surface 36 such that the first composition does not contaminate the first effect region 40.

Optionally, a mold release agent may be introduced to the surface 36 of the mold 34 prior to the step of applying the first composition into the mold cavity 38. In another embodiment, the mold release agent may be introduced to the surface 36 of the mold 34 prior to the step of placing the mask 44 into the mold cavity 38. The mold release agent may be introduced to the surface 36 of the mold 34 by any suitable manner as known in the art, such as by spraying. The mold release agent may be selected from the group of silicones, soaps, waxes, solvents and combinations thereof. The mold release agent may be used to facilitate the removal of the article 20 from the mold cavity 38. The mold release agent may also be used to prevent the sealant layer 48 of the mask 44 from adhering to the surface 36 of the mold 34.

Figure 10:
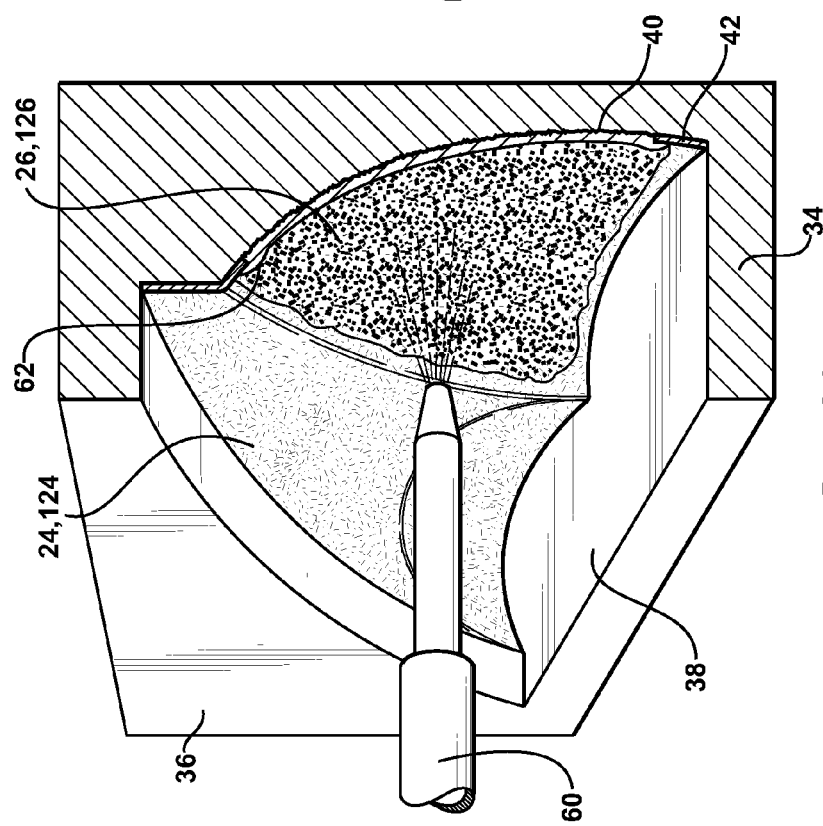
FIG. 10 is a cross-sectional perspective view of the mold of FIG. 9, after the first layer is formed and the mask is removed, illustrating a step of applying a second composition into the mold cavity to form a second layer.

After the first layer 24, 124 is formed, the mask 44 is removed from the first effect region 40. The mask 44 may be removed by any method. For example, the mask 44 may be removed by reducing pressure applied to the mask 44 or by forcibly pulling the mask 44 off of the first effect region 40. As set forth above, the mask 44 may include the handle 58, which may be used to remove the mask 44. FIG. 10 shows the mold 34 after the first layer 24, 124 is formed and the mask 44 is removed from the mold cavity 38.

After the mask 44 is removed, the second composition is applied into the mold cavity 38 to form the second layer 26, 126 adjacent, i.e. on, the first effect region 40. The second composition may be applied by any suitable manner as known in the art. For example, the second composition may be applied by spraying, by directing a powdered material, or by reactive injecting into the mold cavity 38. FIG. 10 shows the spray nozzle 60 applying the second composition into the mold cavity 38 to form the second layer 26, 126. In one embodiment, the second composition may be directed by the spray nozzle 60 substantially towards the first effect region 40 to prevent overlapping such that the overspray bump 62 is minimized or prevented. In another embodiment, the second composition may be directed by the spray nozzle 60 such that the second composition is adjacent to and substantially overlaps the first layer 24, 124. In one embodiment, the second composition is applied while the first layer 24, 124 is still wet. In another embodiment, the first layer 24, 124 is cured or otherwise set to a generally hardened condition to prevent mixing or cross-contamination with the second composition.

Figure 11:
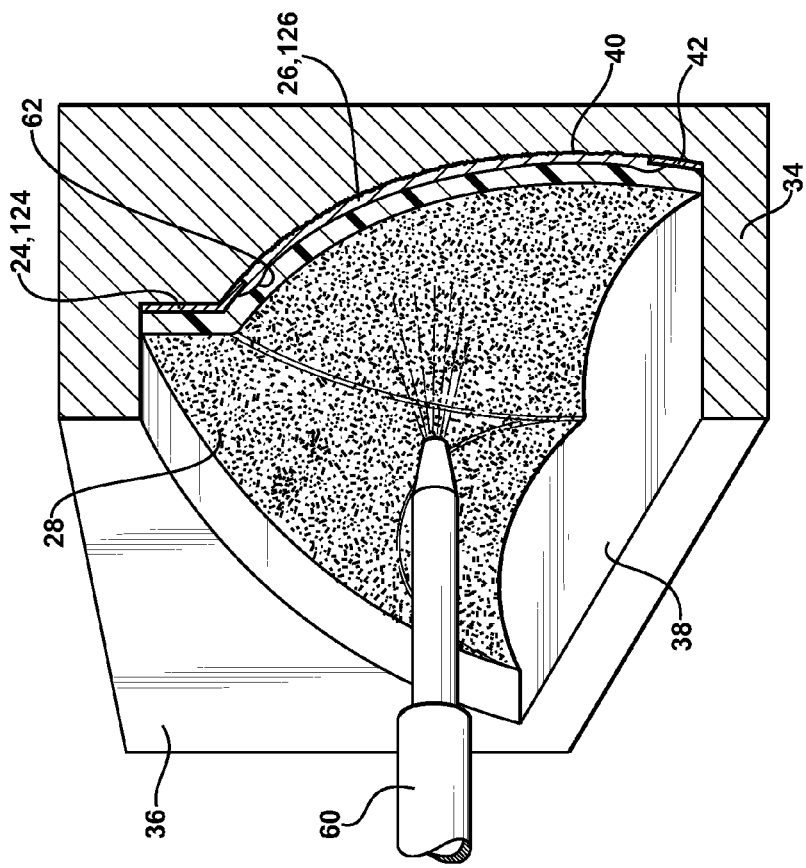
FIG. 11 is a cross-sectional perspective view of the mold of FIG. 10 illustrating a step of applying a polyurethane elastomer composition into the mold cavity to form an elastomeric backing layer.

Optionally, the polyurethane elastomer composition may be applied into the mold cavity 38 to form the elastomeric backing layer 28 after the step of applying the second composition into the mold cavity 38. The polyurethane elastomer composition may be applied by any suitable manner as known in the art, such as by spraying. FIG. 11 shows the spray nozzle 60 applying the polyurethane elastomer composition into the mold cavity 38 to form the elastomeric backing layer 28. In one embodiment, the polyurethane elastomer composition is applied while the first layer 24, 124 and/or the second layer 26, 126 is still wet. In another embodiment, the first layer 24, 124 and/or the second layer 26, 126 is cured or otherwise set to a generally hardened condition to prevent mixing or cross-contamination with the polyurethane elastomer composition.

In one embodiment, the polyurethane foam composition may be applied onto the first layer 24, 124 and the second layer 26, 126 to form the foam backing layer 30. In another embodiment, when the elastomeric backing layer 28 is present, the polyurethane foam composition may be applied onto the elastomeric backing layer 28 to form the foam backing layer 30. It is to be appreciated that the step of applying the polyurethane foam composition onto the first layer 24, 124, the second layer 26, 126 and/or the elastomeric backing layer 28 to form the foam backing layer 30 may be followed while the article 20 is still within the mold cavity 38, or after the article 20 has been demolded from mold cavity 38. The foam backing layer 30 may be applied by any suitable manner as known in the art. For example, the foam backing layer 30 may be applied by pouring and/or by reactive injecting the polyurethane foam composition onto the first layer 24, 124, the second layer 26, 126, and/or the elastomeric backing layer 28 to form the foam backing layer 30. In one embodiment, the polyurethane foam composition is applied while the first layer 24, 124, the second layer 26, 126, and/or the elastomeric backing layer 28 is still wet. In another embodiment, the first layer 24, 124, the second layer 26, 126, and/or the elastomeric backing layer 28 is cured or otherwise set to a generally hardened condition to prevent mixing or cross-contamination with the polyurethane foam composition.

While the above description focuses on making the article 20 in the mold 34, the principle of applying pressure to the mask 44 for masking purposes may also be followed to make the article 20 from a preformed part. Specifically, with such preformed parts, the apparatus of the mold 34 is not necessarily required. Once the first and second paint compositions are applied to the preformed part, as described below, the article 20 is formed.

Figure 12:
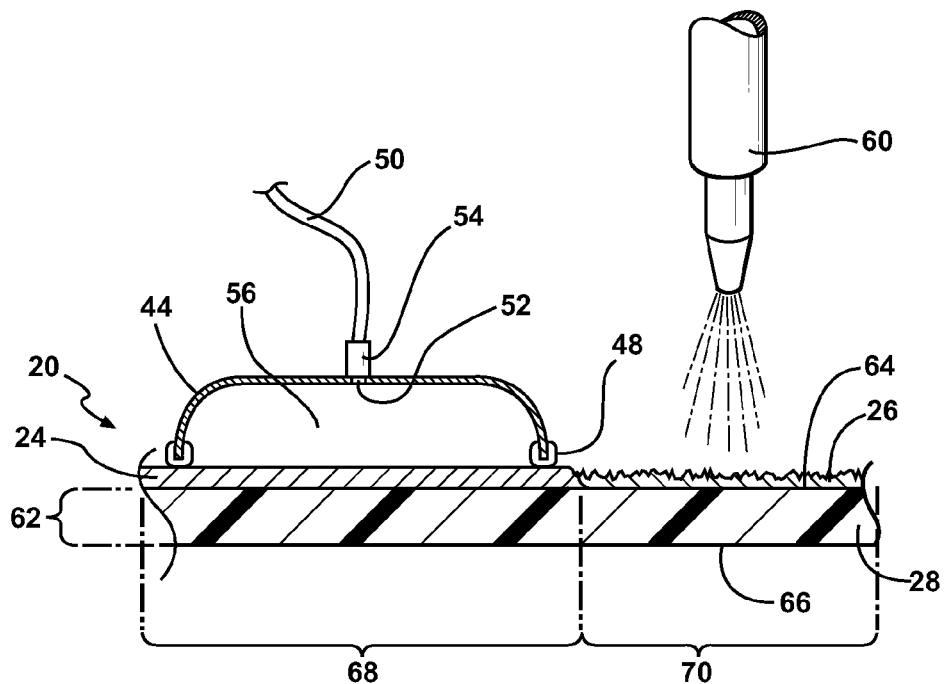
FIG. 12 is a cross-sectional side view of a preformed part including the elastomeric backing layer having a first side with the first side having a first region and a second region and the mask retained adjacent the first region and illustrating a step of applying a second paint composition onto the elastomeric layer to form a second paint layer adjacent the second region.
Figure 13:
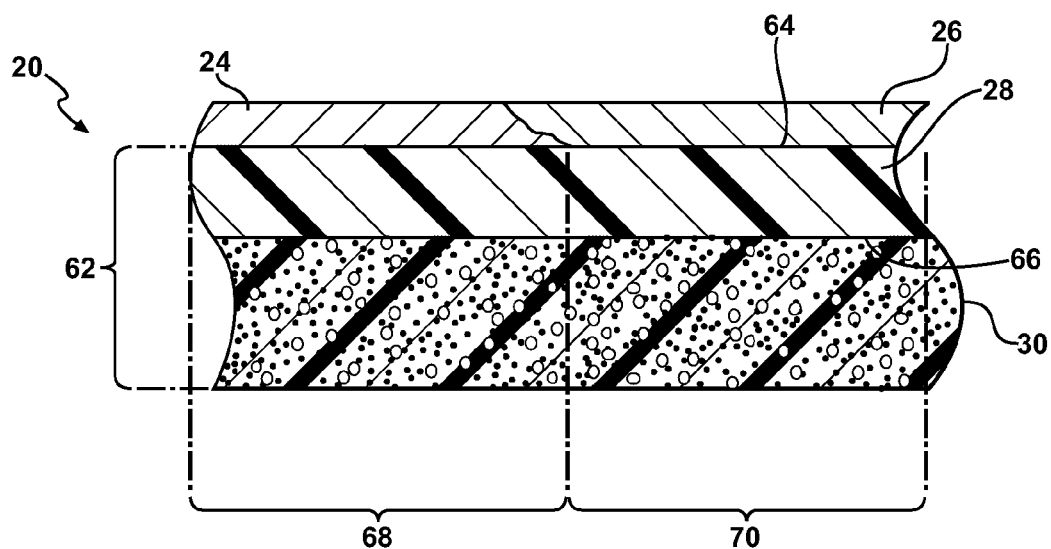
FIG. 13 is a cross-sectional side view of the skin of FIG. 1 taken along line A-A.

Referring to FIGS. 12 and 13, a preformed part is generally indicated at 62. The article 20 made from the preformed part 62 includes the first paint layer 24 and the second paint layer 26. Typically, as shown in FIG. 13, the first paint layer 24 and the second paint layer 26 are adjacent to each other, i.e. the paint layers 24, 26 are substantially co-planar. In one embodiment, the article 20 may have a distinct line between the first paint layer 24 and the second paint layer 26. In another embodiment, the first paint layer 24 and the second paint layer 26 may be slightly spaced from each other, thereby defining a gap or recess there between. In yet another embodiment, the second paint layer 26 is adjacent to and partially overlaps a portion of the first paint layer 24. In other embodiments (not shown), the article 20 may include three or more adjacent paint layers in any combination of the relationships to each other as previously discussed. For example, the article 20 may include red, white, and blue paint layers.

The first paint layer 24 is formed from the first paint composition and the second paint layer 26 is formed from the second paint composition. The first and second paint compositions may be the same or different from each other. The first and second paint compositions may be selected from the group of acrylic-based paint compositions, polyester-based paint compositions, polyurethane-based paint compositions, and combinations thereof. The paint layers 24, 26 provide a desired color, UV degradation resistance, texture, and/or grain pattern of the article 20. The paint layers 24, 26 may include different texture or grain patterns, and may further include different colors than each other. For example, as shown in FIG. 13, the first and second paint layers 24, 26 may have a smooth surface.

Typically, the article 20, and therefore the preformed part 62 prior to making the article 20, includes the elastomeric backing layer 28. The elastomeric backing layer 28 includes a first side 64 and a second side 66 spaced from the first side 64. The first side 64 includes a first region 68 and a second region 70 adjacent to the first region 68. In one embodiment, as shown in FIGS. 12 and 13, the first side 64 of the elastomeric backing layer 28 is adjacent to the first paint layer 24 and the second paint layer 26. The first region 68 of the first side 64 is adjacent the first paint layer 24 and the second region 70 of the first side 64 is adjacent the second paint layer 26. For purposes of the present invention, the first region 68 includes any region that is meant to correspond to the first paint layer 24 and the second region 70 includes any region that is meant to correspond to the second paint layer 26 of the article 20. The first paint layer 24 and the second paint layer 26 may be relatively thin compared to the elastomeric backing layer 28. However, it is to be appreciated that the first paint layer 24, the second paint layer 26, and the elastomeric backing layer 28 may each be of relatively the same thickness.

The elastomeric backing layer 28 is formed from the polyurethane elastomer composition. The polyurethane elastomer composition may include the reaction product of an isocyanate and a polyol. The isocyanate may be selected from the group of aromatic isocyanates, aliphatic isocyanates, and combinations thereof. The polyurethane elastomer composition may also include a UV package and/or other additives as known in the art. The elastomeric backing layer 28 formed from the polyurethane elastomer composition provides a desired elastic tactile, strength, tear resistance, and water resistance quality of the article 20.

Optionally, the article 20, and therefore the preformed part 62 prior to making the article 20, may include a foam backing layer 30. In one embodiment, as shown in FIG. 13, the foam backing layer 30 is adjacent to and substantially overlaps the second side 66 of the elastomeric backing layer 28. The first paint layer 24 and the second paint layer 26 may be relatively thin compared to the foam backing layer 30. However, it is to be appreciated that the first paint layer 24, the second paint layer 26, and the foam backing layer 30 may each be of relatively the same thickness.

The foam backing layer 30 is formed from the polyurethane foam composition. The polyurethane foam composition may include the reaction product of an isocyanate and a polyol. The isocyanate may be selected from the group of aromatic isocyanates, aliphatic isocyanates, and combinations thereof. The isocyanate and the polyol may be the same or different from those of the polyurethane elastomer compositions set forth above. Furthermore, the foam backing layer 30 is formed in the presence of a blowing agent. The blowing agent may be selected from the group of physical blowing agents, chemical blowing agents, and combinations thereof. The polyurethane foam composition may also include a UV package and/or other additives as known in the art. The foam backing layer 30 formed from the polyurethane foam composition provides a desired elastic tactile and kinetic energy absorption quality of the article 20.

To make the article 20 from the preformed part 62, the method of the present invention includes the step of applying the first paint composition onto the elastomeric backing layer 28 to form the first paint layer 24 adjacent the first region 68. The first paint composition may be applied by any suitable manner as known in the art. For example, the first paint composition may be applied by spraying or by directing a powdered material onto the first region 68.

After the first paint layer 24 has formed, the mask 44 is placed onto the elastomeric backing layer 28 adjacent the first region 68. FIG. 12 shows the mask 44 adjacent to the first region 68. The mask 44 is shaped and sized to cover the first region 68 of the elastomeric backing layer 28. In one embodiment, the mask 44 may be pre-formed into a preset shape. In another embodiment, the mask 44 may be custom-made for covering the first region 68 of the elastomeric backing layer 28. The mask 44 may be custom-made as previously described above. The mask 44 may be formed from any suitable material. In one embodiment, the mask 44 is placed onto the elastomeric backing layer 28 adjacent the first region 68 while the first paint layer 24 is still wet. In another embodiment, the first paint layer 24 is cured or otherwise set to a generally hardened condition to prevent contamination or disturbance of the first paint layer 24 by the mask 44.

Pressure is applied to the mask 44 to retain the mask 44 adjacent, i.e. on, the first region 68. Pressure may be applied by any method or equipment known in the art. Pressure applied to the mask 44 may be continuous or intermittent. Typically, pressure is applied by vacuum. For example, pressure may be applied by a vacuum pump. In one embodiment, as shown in FIG. 12, the mask 44 is pierced to define the hole 52. The vacuum line 50 is attached to the vacuum port 54 attached to the hole 52. Vacuum is applied through the hole 52 in the mask 44 to retain the mask 44 adjacent the first region 68. The vacuum port 54 may be used to regulate vacuum applied to the mask 44 through the vacuum line 50. The vacuum port 54 may also be used as a quick-connect/disconnect between the vacuum line 50 and the mask 44. As shown in FIG. 12, the mask 44 may include the flexible seal 48. The flexible seal 48 compensates for any tolerance variations between the mask 44 and the first region 68.

As shown in FIG. 12, when the mask 44 is placed onto the elastomeric backing layer 28, the airtight envelope 56 is defined between the mask 44 and the first paint layer 24. While the mask 44 is shown such that the airtight envelope 56 appears large, it is to be appreciated that in other embodiments, the airtight envelope 56 may be small such that the mask 44 is substantially adjacent the first paint layer 24. In yet another embodiment, a substantial portion of the mask 44 may abut the first paint layer 24. It is to be appreciated that the airtight envelope 56 may seal any fluid, and is not limited to air.

After the mask 44 is retained adjacent the first region 68, the second paint composition is applied onto the elastomeric backing layer 28 to form the second paint layer 26 adjacent, i.e. on, the second region 70. The second paint composition may be applied by any suitable manner as known in the art. For example, the second paint composition may be applied by spraying or by directing a powdered material onto the second region. FIG. 12 shows a spray nozzle 60 applying the second paint composition onto the second region 70 to form the second paint layer 26. As shown in FIG. 12, the mask 44 covers and protects the first region 68 and the first paint layer 24 from the second paint composition. It should be appreciated, that if a leak is present in the airtight envelope 56 and if the second paint composition enters through the leak, the second paint composition is drawn toward the hole 52 in the mask 44 such that the second paint composition does not contaminate the first paint layer 24.

After the second paint composition is applied to the second region 70, the mask 44 is removed from the first region 68. The mask 44 may be removed by any method. For example, the mask 44 may be removed by reducing pressure applied to the mask 44 or by forcibly pulling the mask 44 off of the first region 68 of the article 20. In one embodiment, the mask 44 is removed from the first region 68 while the second paint layer 26 is still wet. In another embodiment, the first paint layer 26 is cured or otherwise set to a generally hardened condition to prevent contamination or disturbance of the second paint layer 26 during the step of removing the mask 44.

Obviously, many modifications and variations of the present invention are possible in light of the above teachings. The invention may be practiced otherwise than as specifically described within the scope of the appended claims.

What is claimed is:

1. A method of making an article in a mold including a surface defining a mold cavity with the surface having a first effect region and a second effect region in the mold cavity, said method comprising the steps of:
   placing a mask into the mold cavity adjacent the first effect region and defining an airtight envelope between the mask and the surface of the mold;
   applying vacuum to the mask thereby evacuating the airtight envelope and retaining the mask adjacent the first effect region;
   applying a first composition into the mold cavity to form a first layer adjacent the second effect region;
   removing the mask from the first effect region; and
   applying a second composition into the mold cavity to form a second layer adjacent the first effect region and over at least a portion of the first layer,
   wherein the mask is formed from a composite material and has an inner surface spaced from the surface of the mold such that the airtight envelope is defined between at least the inner surface of the mask and the surface of the mold, and the mask and/or the mold defines a hole extending through the mask and/or the mold and in fluid communication with the airtight envelope for evacuating the airtight envelope during the step of applying vacuum to the mask, and
   wherein the composite material comprises a mat formed from a reinforcing fiber material and a curable resin.

2. The method as set forth in claim 1 wherein the first effect region defines a first texture and the second effect region defines a second texture different than the first texture.

3. The method as set forth in claim 1 wherein the steps of applying the first and second compositions are further defined as spraying the first and second compositions.

4. The method as set forth in claim 1 further comprising the step of introducing a mold release agent onto the surface of the mold prior to the step of applying the first composition into the mold cavity.

5. An article made according to the method as set forth in claim 1.

6. The article as set forth in claim 5 further defined as at least one of a headrest, a trim panel, a seat, a pillar trim panel, an instrument panel, a door panel, and an armrest.

7. The method as set forth in claim 1 wherein the mold is an open mold and the mask defines a hole extending through the mask and in fluid communication with the airtight envelope, wherein the step of applying vacuum to the mask is further defined as applying vacuum through the hole in the mask thereby evacuating the airtight envelope and retaining the mask adjacent the first effect region.

8. The method as set forth in claim 1 wherein the mold defines a hole extending through the first effect region in the mold cavity and in fluid communication with the airtight envelope, wherein the step of applying vacuum to the mask is further defined as applying vacuum through the hole in the surface thereby evacuating the airtight envelope and retaining the mask adjacent the first effect region.

9. A method as set forth in claim 7 wherein the step of applying vacuum through the hole in the mask is further defined as applying vacuum through the hole in the mask with a vacuum pump.

10. A method as set forth in claim 1 wherein the mat is a glass fiber mat having void spaces and the curable resin is an epoxy that is disposed in and cured in the void spaces and wherein the mask retains its shape during the steps of said method.

11. A method as set forth in claim 1 wherein the hole is defined by the mask and the hole is spaced from a peripheral edge of the mask such that the step of applying vacuum to the mask is further defined as applying vacuum through the hole in the mask thereby evacuating the airtight envelope and retaining the mask adjacent the first effect region.

12. A method as set forth in claim 11 wherein the step of applying vacuum through the hole in the mask is further defined as applying vacuum through the hole in the mask with a vacuum pump and further comprising the step of providing a vacuum line in fluid communication between the vacuum pump and the hole for applying vacuum to the mask.

13. A method as set forth in claim 1 wherein the step of applying a first composition is further defined as applying a first paint composition such that the first layer is a first paint layer and the step of applying a second composition is further defined as applying a second paint composition such that the second layer is a second paint layer and further comprising the step of applying a polyurethane elastomer composition into the mold cavity to form an elastomeric backing layer over at least a portion of each of the first paint layer and the second paint layer after the step of applying the second paint composition into the mold cavity.

14. The method as set forth in forth in claim 13 further comprising the step of applying a polyurethane foam composition onto the elastomeric backing layer to form a foam backing layer.

15. The method as set forth in claim 1 further comprising the step of forming the mask in the mold prior to the step of placing the mask into the mold.

16. The method as set forth in claim 1 wherein the first composition is further defined as a first paint composition.

17. The method as set forth in claim 16 wherein the first paint composition is selected from the group of acrylic-based paint compositions, polyester-based paint compositions, polyurethane-based paint compositions, and combinations thereof.

18. The method as set forth in claim 16 wherein the second composition is further defined as a second paint composition.

19. The method as set forth in claim 18 wherein the second paint composition is selected from the group of acrylic-based paint compositions, polyester-based paint compositions, polyurethane-based paint compositions, and combinations thereof.

20. The method as set forth in claim 18 further comprising the step of applying a polyurethane elastomer composition into the mold cavity to form an elastomeric backing layer after the step of applying the second paint composition into the mold cavity.

21. The method as set forth in forth in claim 20 further comprising the step of applying a polyurethane foam composition onto the elastomeric backing layer to form a foam backing layer.

22. The method as set forth in claim 1 wherein the second composition is further defined as a second paint composition.

23. The method as set forth in claim 1 wherein the first composition is further defined as a first polyurethane elastomer composition.

24. The method as set forth in claim 23 wherein the second composition is further defined as a second polyurethane elastomer composition.

25. The method as set forth in forth in claim 24 further comprising the step of applying a polyurethane foam composition onto the first and second layers to form a foam backing layer.

26. The method as set forth in claim 1 wherein the second composition is further defined as a second polyurethane elastomer composition.

27. The method as set forth in claim 1 further comprising the step of applying a polyurethane elastomer composition into the mold cavity to form an elastomeric backing layer after the step of applying the second composition into the mold cavity.

28. The method as set forth in forth in claim 27 further comprising the step of applying a polyurethane foam composition onto the elastomeric backing layer to form a foam backing layer.

* * * * *